US012764553B2

(12) United States Patent
Zeng et al.

(10) Patent No.: US 12,764,553 B2
(45) Date of Patent: Oct. 13, 2026

(54) SPECTRUM SHARING METHOD AND APPARATUS, AND COMPUTER STORAGE MEDIUM

(71) Applicant: ZTE CORPORATION, Shenzhen (CN)

(72) Inventors: Zhaohua Zeng, Shenzhen (CN); Yong Zhan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 387 days.

(21) Appl. No.: 18/691,652

(22) PCT Filed: Aug. 9, 2022

(86) PCT No.: PCT/CN2022/111241
§ 371 (c)(1),
(2) Date: Mar. 13, 2024

(87) PCT Pub. No.: WO2023/040518
PCT Pub. Date: Mar. 23, 2023

(65) Prior Publication Data

US 2024/0406800 A1 Dec. 5, 2024

(30) Foreign Application Priority Data

Sep. 15, 2021 (CN) ......................... 202111082707.8

(51) Int. Cl.
*H04W 28/08* (2023.01)
*H04W 16/14* (2009.01)
(Continued)

(52) U.S. Cl.
CPC ........... *H04W 16/14* (2013.01); *H04W 24/02* (2013.01); *H04W 28/0226* (2013.01);
(Continued)

(58) Field of Classification Search
CPC ......... H04W 28/0942; H04W 28/0226; H04W 28/08; H04W 16/14; H04W 72/543; H04W 24/02; H04W 36/22; H04W 48/06
See application file for complete search history.

(56) References Cited

U.S. PATENT DOCUMENTS

| | | | |
|---|---|---|---|
| 6,990,087 | B2 | 1/2006 | Rao et al. |
| 8,254,393 | B2 | 8/2012 | Horvitz |

(Continued)

FOREIGN PATENT DOCUMENTS

| | | | |
|---|---|---|---|
| CN | 106937293 | A | 7/2017 |
| CN | 112469075 | A | 3/2021 |
| CN | 112996047 | A | 6/2021 |

OTHER PUBLICATIONS

3GPP Technical Specification Group Radio Access Network. "Discussion on the PRACH Coordination in Dynamic Spectrum Sharing," 3GPP TSG-RAN WG3 Meeting #109-e, Aug. 2020, pp. 1-3.
(Continued)

*Primary Examiner* — Redentor Pasia
(74) *Attorney, Agent, or Firm* — Vivacqua Crane, PLLC

(57) ABSTRACT

A spectrum sharing method and apparatus, and a computer storage medium are disclosed. The spectrum sharing method may include: performing load prediction for a first cell to obtain first load prediction data; performing load prediction for a second cell to obtain second load prediction data; and migrating a User Equipment (UE) of the first cell to the second cell and allocating a shared spectrum resource corresponding to the first cell to a third cell, in response to determining according to the first load prediction data and the second load prediction data that the first cell satisfies a migration condition, a standard level of the first cell is higher than or equal to a standard level of the second cell, and a standard level of the third cell is higher than the standard level of the first cell.

20 Claims, 9 Drawing Sheets

(51) Int. Cl.

| | |
|---|---|
| ***H04W 24/02*** | (2009.01) |
| ***H04W 28/02*** | (2009.01) |
| ***H04W 72/543*** | (2023.01) |

(52) U.S. Cl.

CPC ....... *H04W 28/08* (2013.01); *H04W 28/0942* (2020.05); *H04W 72/543* (2023.01)

(56) References Cited

U.S. PATENT DOCUMENTS

| | | | | |
|---|---|---|---|---|
| 9,408,210 | B2 | 8/2016 | Pikhletsky et al. | |
| 12,048,034 | B2 * | 7/2024 | Supanekar | H04W 36/1443 |
| 2013/0040683 | A1 * | 2/2013 | Siomina | H04W 24/08<br>455/517 |
| 2014/0334294 | A1 | 11/2014 | Ericson et al. | |
| 2018/0027419 | A1 | 1/2018 | Xu et al. | |
| 2018/0242160 | A1 * | 8/2018 | Morita | H04W 16/08 |
| 2019/0319868 | A1 * | 10/2019 | Svennebring | H04L 41/147 |
| 2021/0258825 | A1 * | 8/2021 | Stawiarski | H04W 28/0284 |
| 2022/0369399 | A1 * | 11/2022 | Vivanco | H04W 36/22 |
| 2023/0164657 | A1 * | 5/2023 | Yang | H04W 36/0061<br>455/436 |
| 2023/0403606 | A1 * | 12/2023 | Lunardi | H04W 24/02 |
| 2024/0039625 | A1 * | 2/2024 | Medles | H04B 7/1851 |
| 2024/0107506 | A1 * | 3/2024 | Lei | H04W 52/0206 |
| 2024/0179568 | A1 * | 5/2024 | Zeng | H04L 47/127 |
| 2024/0196252 | A1 * | 6/2024 | Soldati | H04W 24/10 |
| 2024/0196274 | A1 * | 6/2024 | Lunardi | H04W 24/02 |
| 2024/0205781 | A1 * | 6/2024 | Li | H04W 36/32 |

OTHER PUBLICATIONS

International Searching Authority. International Search Report and Written Opinion for PCT Application No. PCT/CN2022/111241 and English translation, mailed Oct. 10, 2022, pp. 1-9.

European Patent Office. Extended European Search Report for EP Application No. 22868895.8, mailed Dec. 16, 2024, pp. 1-11.

Intellectual Property India. Examination Report for IN Application No. 202417027068 and English translation, mailed May 11, 2026, pp. 1-7.

* cited by examiner

SPECTRUM SHARING METHOD AND APPARATUS, AND COMPUTER STORAGE MEDIUM

CROSS-REFERENCE TO RELATED APPLICATION

This application is a national stage filing under 35 U.S.C. § 371 of international application number PCT/CN2022/111241 filed Aug. 9, 2022, which claims priority to Chinese patent application No. 202111082707.8, filed Sep. 15, 2021. The contents of these applications are incorporated herein by reference in their entirety.

TECHNICAL FIELD

The present disclosure relates to the technical field of communications, and more particularly, to a spectrum sharing method and apparatus, and a computer storage medium.

BACKGROUND

Currently, operators are required to simultaneously provide wireless access services for 5th Generation Mobile Communication Technology (5G), 4G, 3G, and 2G. To conserve spectrum resources and adapt to the diversity and dynamic change of the ratio between requirements of User Equipments (UEs) of different standards in time and space dimensions, some operators introduce a Dynamic Spectrum Sharing (DSS) function, such that they can provide wireless access services of multiple standards on a single spectrum resource at the same time, and the ratio between spectrum resources occupied by services of different standards can be dynamically changed with the load.

Devices supporting higher standards are increasingly dominating the market share annually and are expected to eventually phase out devices with lower standards. In some cases, to address spectrum utilization imbalances, an operator needs to regularly check the proportions of users and traffic of different standards in spectrum sharing and DSS cells in a network by region. When the proportions of 5G users and traffic in a region stabilizes to a certain level, all spectrum sharing and DSS cells in the region can be manually switched to pure 5G cells. However, this process requires a significant number of network planning engineers and carries the risk of necessitating frequent adjustments. Moreover, converting to pure 5G stations necessitates further network planning and adjustments to the network configuration.

SUMMARY

The following is a summary of the subject matter set forth in this description. This summary is not intended to limit the scope of protection of the claims.

Embodiments of the present disclosure provide a spectrum sharing method and apparatus, and a computer storage medium.

In accordance with a first aspect of the present disclosure, an embodiment provides a spectrum sharing method, including: performing load prediction for a first cell to obtain first load prediction data; performing load prediction for a second cell to obtain second load prediction data; and migrating a UE of the first cell to the second cell and allocating a shared spectrum resource corresponding to the first cell to a third cell, in response to determining according to the first load prediction data and the second load prediction data that the first cell satisfies a migration condition, where a standard level of the first cell is higher than or equal to a standard level of the second cell, and a standard level of the third cell is higher than the standard level of the first cell.

In accordance with a second aspect of the present disclosure, an embodiment provides a spectrum sharing apparatus, including a memory, a processor, and a computer program stored in the memory and executable by the processor, where the computer program, when executed by the processor, causes the processor to carry out the spectrum sharing method in accordance with the first aspect.

In accordance with a third aspect of the present disclosure, an embodiment provides a computer-readable storage medium, storing a computer program which, when executed by a processor, causes the processor to carry out the spectrum sharing method in accordance with the first aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and are not intended to limit the technical schemes of the present disclosure.

DETAILED DESCRIPTION

To make the objects, technical schemes, and advantages of the present disclosure clear, the present disclosure is described in further detail in conjunction with accompanying drawings and examples. It should be understood that the embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present disclosure provides a spectrum sharing method. In the spectrum sharing method, load prediction is respectively performed for a first cell and a second cell to obtain first load prediction data of the first cell and second load prediction data of the second cell. It is determined according to the first load prediction data and the second load prediction data whether the first cell satisfies a migration condition. When the first cell satisfies the migration condition, a UE of the first cell is migrated to the second cell and a shared spectrum resource corresponding to the first cell is allocated to a third cell, such that the third cell can exclusively use the shared spectrum resource. A standard level of the first cell is higher than or equal to a standard level of the second cell, and a standard level of the third cell is higher than the standard level of the first cell. In this way, spectrum resources occupied by the cells are automatically adjusted according to future load states of the cells. The second cell provides a spectrum resource for the UE of the first cell and the shared spectrum resource corresponding to the first cell is allocated to the third cell, such that the third cell exclusively uses the shared spectrum resource, use experience of users of the third cell is improved, manpower required for network optimization is reduced, and the accuracy of adjustment is improved.

Figure 1:
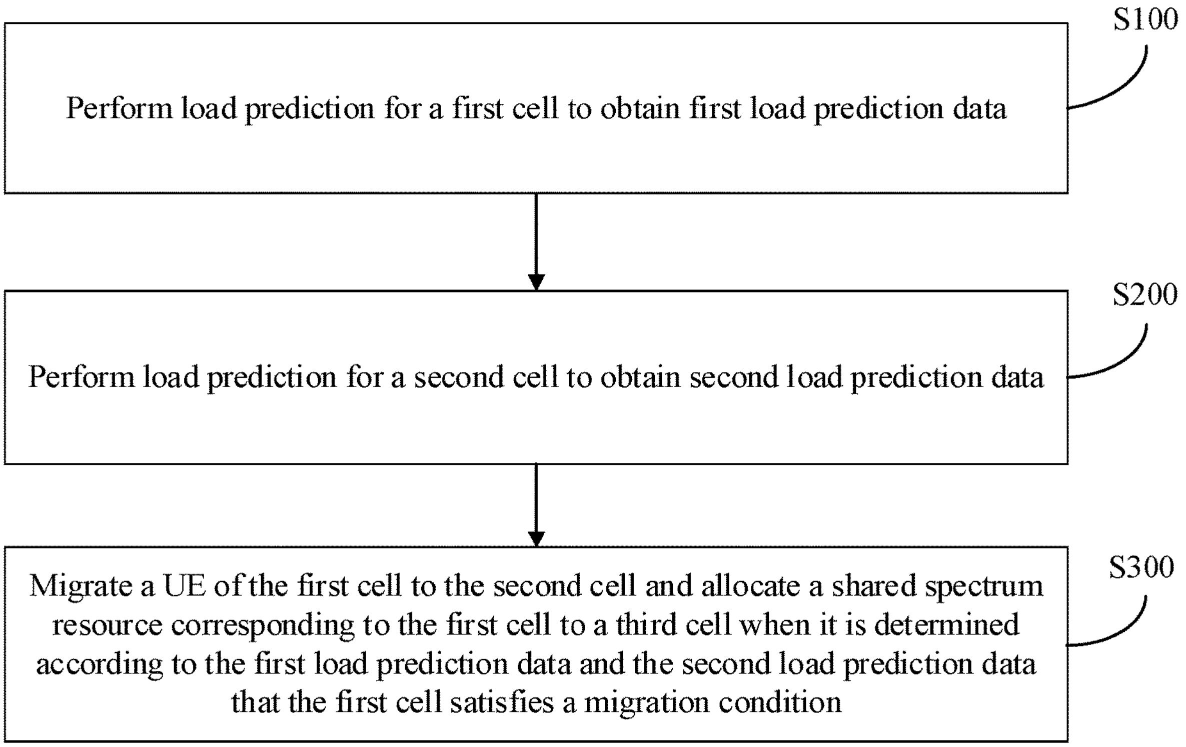
FIG. 1 is a flowchart of a spectrum sharing method according to an embodiment of the present disclosure.

FIG. 1 is a flowchart of a spectrum sharing method according to an embodiment of the present disclosure. The spectrum sharing method may be applied to a spectrum sharing apparatus. The spectrum sharing method includes, but not limited to, the following steps S100, S200, and S300.

At S100, load prediction is performed for a first cell to obtain first load prediction data.

At S200, load prediction is performed for a second cell to obtain second load prediction data.

It can be understood that a standard level of the first cell is higher than or equal to a standard level of the second cell. For example, the standard level of the first cell may be 4G, and the standard level of the second cell may be 4G, 3G, or 2G. In addition, a frequency band occupied by the first cell is different from a frequency band occupied by the second cell. The second cell may be obtained according to a preset list or determined according to a UE range of the first cell and a signal coverage range of each cell, such that when the first cell satisfies the migration condition, the second cell can take over a UE of the first cell and the second cell can provide a corresponding service to the UE of the first cell. If the standard level of the first cell is the same as that of the second cell, the second cell can take over the UE of the first cell and provide a service with the same standard level to the UE of the first cell, thereby ensuring use experience of the user of the first cell. A UE with a high standard level can use a service with a low standard level. Therefore, even if the standard level of the second cell is lower than that of the first cell, the UE originally in the first cell can use the service provided by the second cell. As such, after the UE of the first cell is migrated to the second cell, a usage requirement of the user of the first cell can also be met.

To reduce the number of migrations of a UE between cells and provide a stable network service for the user, the UE camps on the takeover cell for a period of time after migration. If, after taking over the UEs from the first cell, the number of UEs accessing the second cell increases, leading to a higher load and resulting in the second cell's inability to continue taking over, or if the load in the first cell is too high for the second cell to take over, it will affect the user experience of both the original users of the second cell and those migrated from the first cell. Therefore, it is necessary to perform load prediction for the first cell and the second cell respectively to obtain the first load prediction data of the first cell and the load prediction data of the second cell, i.e., to predict future load states of the first cell and the second cell and determine whether the first cell satisfies the migration condition, so as to ensure the use experience of the users of the first cell and the users of the second cell.

It should be noted that the first load prediction data may be at least one of a Physical Resource Block (PRB) utilization rate, a number of Radio Resource Control (RRC) users, or a number of activated UEs in the first cell, and the second load prediction data may be at least one of a PRB utilization rate, a number of RRC users, or a number of activated UEs in the second cell. In addition, the load prediction for the first cell and the second cell may be performed using a time series algorithm, and the load prediction for the first cell and the second cell may be performed periodically to determine whether the first cell satisfies the migration condition. A periodicity of load prediction for the first cell and the second cell may be preset, and the period duration may be 15 minutes, 30 minutes, or 1 hour.

At S300, a UE of the first cell is migrated to the second cell and a shared spectrum resource corresponding to the first cell is allocated to a third cell, when it is determined according to the first load prediction data and the second load prediction data that the first cell satisfies a migration condition.

It can be understood that a standard level of the third cell is higher than the standard level of the first cell, and the first cell and the second cell occupy the same spectrum resource. Therefore, the first cell and the second cell share the spectrum resource, e.g., by Spectrum Sharing (SS) or Dynamic Spectrum Sharing (DSS), and the same spectrum resource is used simultaneously by a 4G cell and a 5G cell at adjacent spatial locations. Determining according to the first load prediction data and the second load prediction data whether the first cell satisfies the migration condition means determining whether the second cell can completely take over the UE of the first cell. There may be a plurality of second cells. In this case, the UEs of the first cell may be distributed to the second cells according to future load states of the second cells, or also be evenly distributed to the second cells. There may also be a plurality of first cells. In this case, it needs to be determined one by one whether each first cell satisfies the migration condition. In addition, to ensure the use experience of the users of the first cell after migration, it may further be determined whether the impact on quality of service of the UE after the second cell takes over the UE of the first cell is within an acceptable range. If the impact on quality of service of the UE after the second cell takes over the UE of the first cell is within the acceptable range, it can be considered that the second cell can completely take over the UE of the first cell, thereby ensuring the use experience of the user of the first cell after the UE is migrated to the second cell.

If the first cell satisfies the migration condition, the UE of the first cell is migrated to the second cell. The second cell provides a service to the UE of the first cell, and the shared spectrum resource occupied by the first cell is allocated to the third cell. In this way, the third cell can occupy more spectrum resources, thereby improving the use experience of users of the third cell. When only the first cell and the third cell share a spectrum resource, and the UE of the first cell is migrated to the second cell, the third cell can exclusively use the shared spectrum resource. Therefore, the occupation of the spectrum resources can be automatically adjusted according to the load prediction data of the first cell and the second cell, thereby reducing manpower required for network optimization, improving the use experience of the users of the third cell with a high standard level, and ensuring the use experience of the users of the first cell. In a case where cells corresponding to a plurality of standard levels share spectrum resources, a cell with a high standard level needs to maintain Resource Element (RE)-level rate matching to avoid signals frequently sent by a cell with a low standard level. However, if the cell with the low standard level maintains RE-level rate matching, a lot of spectrum resources are wasted. In other words, spectrum resources are wasted in the case where cells corresponding to a plurality of standard levels share spectrum resources. With the method of the present disclosure, in a case where a cell with a low standard level and a cell with a high standard level share a spectrum resource, the state of each cell can be automatically adjusted according to the load status of each cell. To be specific, the UE of the first cell with a low standard level is migrated out, and the third cell occupies the shared spectrum resource corresponding to the first cell. In this way, the third cell exclusively uses the shared spectrum resource, thereby avoiding the waste of resources, improving the utilization of spectrum resources, reducing manpower required for network optimization, and improving the accuracy of adjustment.

Figure 2:
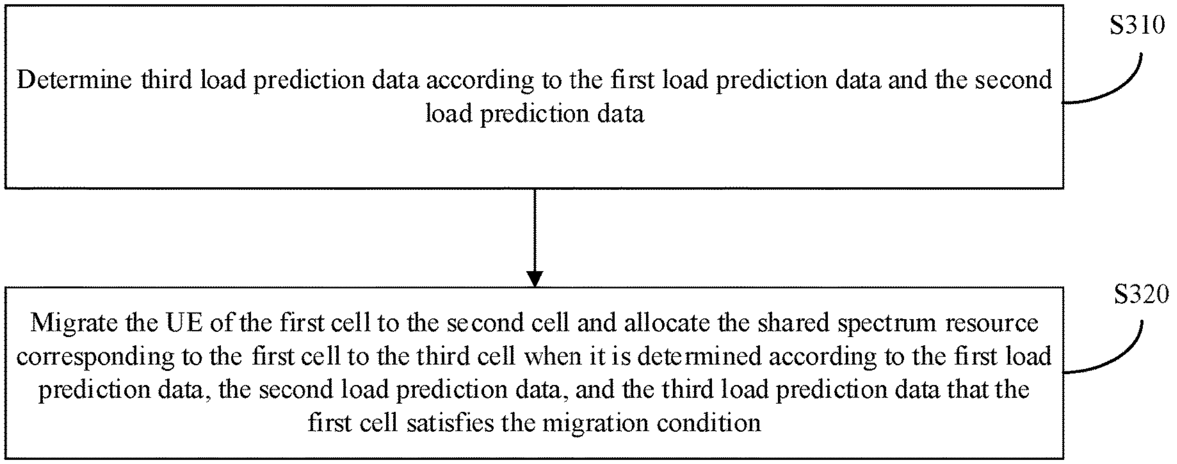
FIG. 2 is a schematic diagram of an implementation process of S300 in FIG. 1.

Referring to FIG. 2, S300 in the embodiment shown in FIG. 1 further includes, but not limited to, the following steps S310 and S320.

At S310, third load prediction data is determined according to the first load prediction data and the second load prediction data.

At S320, the UE of the first cell is migrated to the second cell and the shared spectrum resource corresponding to the first cell is allocated to the third cell, when it is determined according to the first load prediction data, the second load prediction data, and the third load prediction data that the first cell satisfies the migration condition.

The migration condition includes that the first load prediction data is lower than a preset first off threshold and the third load prediction data is lower than a preset first takeover threshold.

It can be understood that if the load of the first cell is high, i.e., there are a large number of UEs in the first cell and the first cell needs to occupy a large number of spectrum resources, migrating the UEs of the first cell occupying the large number of spectrum resources will increase the load of an adjacent cell, i.e., the second cell, and affect the use experience of the users of the second cell, or even the second cell may not be able to completely take over the UEs of the first cell. In addition, migrating the first cell with a large number of UEs involves high throughput and a long migration time, and is likely to affect the use experience of the users. Therefore, the migration is triggered only when the first load prediction data of the first cell is lower than the preset first off threshold, i.e., when it is considered that the load of the first cell in a future period of time is low. When the number of UEs in the first cell is small, migrating the UEs of the first cell involves low throughput and a short migration time and has little impact on the users of the first cell, so that the use experience of the users of the first cell can be ensured. In addition, if the first cell and the third cell share spectrum resources when the load of the first cell is low, there is a waste of spectrum resources, leading to low utilization of spectrum resources. Therefore, when the first load prediction data of the first cell is lower than the preset first off threshold, the UEs of the first cell are migrated to the second cell, and the shared spectrum resource corresponding to the first cell is allocated to the third cell. In this way, the third cell exclusively uses the shared spectrum resource, thereby reducing the waste of spectrum resources and improving the utilization of spectrum resources.

When the first load prediction data is lower than the preset first off threshold, it is also necessary to determine whether the impact on quality of service of the UEs after the second cell takes over the UEs of the first cell is within the acceptable range. Whether the impact on quality of service of the UEs is within the acceptable range is based on whether the third load prediction data for the migration of the UEs of the first cell is lower than the preset first takeover threshold after the UEs of the first cell are migrated to one or more second cells in a spectrum sharing scenario. If the third load prediction data is lower than the preset first takeover threshold, it can be considered that the impact on quality of service of the UEs after the second cell takes over the UEs of the first cell is within the acceptable range, and the UEs of the first cell can be migrated to the second cell. If the third load prediction data is higher than or equal to the preset first takeover threshold, it can be considered that the load of the second cell is high and the number of UEs to be taken over is large. In this case, the impact on the quality of service of the UEs after the second cell takes over the UEs of the first cell exceeds the acceptable range, and the use experience of the users of the second cell and the users migrated to the second cell from the first cell is affected. The third load prediction data is calculated based on the first load prediction data of the first cell, the second load prediction data of the second cell, and an overlapping coverage degree of the first cell and the second cell. For example, the third load prediction data may be a sum of the first load prediction data and the second load prediction data. Therefore, when the first load prediction data is lower than the preset first off threshold and the third load prediction is lower than the preset first takeover threshold, i.e., the first cell satisfies the migration condition, it can be considered that the second cell can completely take over the UEs migrated from the first cell, and the impact on quality of service of the UEs after the UEs of the first cell are migrated to the second cell is within the acceptable range. As such, the use experience of the users of the first cell and the second cell can be ensured, and the accuracy of the migration operation can be improved. Thereby, the UEs of the first cell are migrated to the second cell, the second cell provides a service to the UEs that the second cell takes over, and the shared spectrum resource corresponding to the first cell is occupied by the third cell. In this way, the third cell with a high standard level exclusively uses the shared spectrum resource, improving the use experience of the users of the cell with the high standard level and improving the utilization of spectrum resources.

It should be noted that the overlapping coverage degree refers to a proportion of an overlapping coverage area between two cells, and is represented by a percentage parameter. The overlapping coverage degree can be configured for all neighboring cell relationships, and has a value range of (0, 1%, . . . , 100%). A neighboring cell with an overlapping coverage degree greater than or equal to a correlation threshold of a load balancing neighboring cell relationship is determined as a real neighboring cell. The overlapping coverage degree may be a preset parameter, or may be automatically calculated based on a signal strength of a current cell and a neighboring cell actually measured and reported by the UE.

Figure 3:
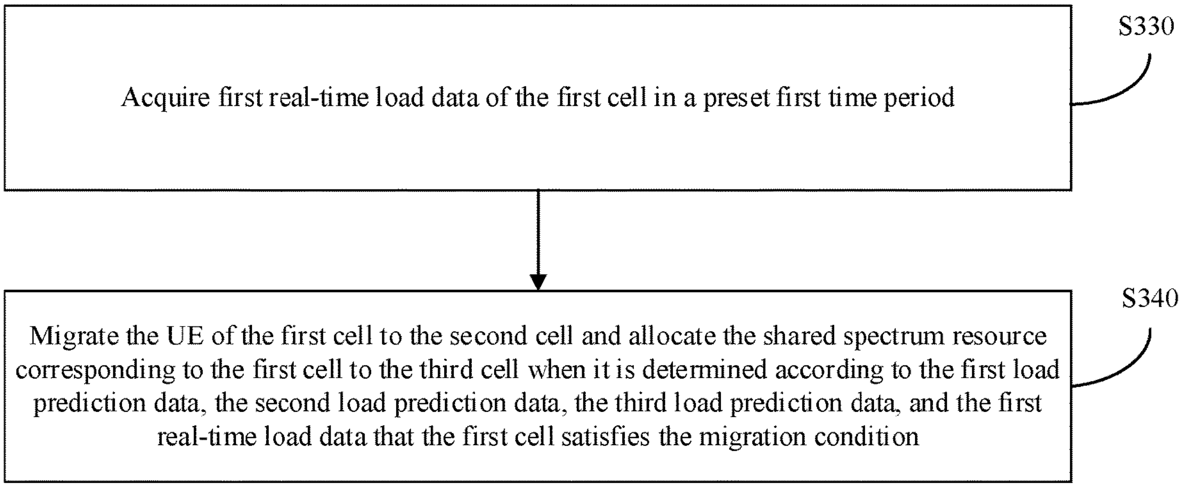
FIG. 3 is a schematic diagram of an implementation process of S300 in FIG. 1.

Referring to FIG. 3, S320 in the embodiment shown in FIG. 1 further includes, but not limited to, the following steps S330 and S340.

At S330, first real-time load data of the first cell in a preset first time period is acquired.

At S340, the UE of the first cell is migrated to the second cell and the shared spectrum resource corresponding to the first cell is allocated to the third cell, when it is determined according to the first load prediction data, the second load prediction data, the third load prediction data, and the first real-time load data that the first cell satisfies the migration condition.

The migration condition further includes that the first real-time load data is lower than a preset first real-time load threshold.

It can be understood that because the migration of the UEs of the first cell is for the purpose of improving the utilization of spectrum resources and the use experience of the users of the third cell with the high standard level, if the current load state of the first cell is high, i.e., the number of UEs currently accessing the first cell is large, the migration involves high throughput and is difficult to implement, and it is difficult for the second cell to completely take over the huge number of UEs of the first cell. Therefore, it needs to be determined whether the migration the UEs of the first cell is necessary. When the first load prediction data is lower than the preset first off threshold and the third load prediction data is lower than the preset first takeover threshold, the first real-time load data of the first cell in the preset first time period needs to be further acquired. If the first real-time load data is lower than the preset first real-time load threshold, it is considered that the number of UEs currently accessing the first cell is small and the load of the first cell is low, and the second cell can take over the UEs of the first cell. Therefore, the UEs of the first cell are migrated to the second cell. The first real-time load data may include a plurality of pieces of first unit load data. For example, the first cell is measured multiple times within the preset first time period to obtain a plurality of pieces of consecutive first unit load data. The measurements of the first cell in the preset first time period may be periodic measurements. For example, when the preset first time period is one hour, the first cell may be measured every 15 minutes, and four pieces of first unit load data are obtained to form the first real-time load data. For another example, when the preset first time period is 30 seconds, the first cell may be measured every 10 seconds, and three pieces of first unit load data are obtained to form the first real-time load data. When the first real-time load data includes a plurality of pieces of first unit load data, the migration condition is that a ratio of the number of pieces of first unit load data lower than the first real-time load threshold to the total number of pieces of first unit load data in the first real-time load data is greater than a preset first ratio. If the ratio of the number of pieces of first unit load data lower than the first real-time load threshold to the total number of pieces of first unit load data in the first real-time load data is greater than the preset first ratio, it can be considered that the current load of the first cell is low and the number of UEs accessing the first cell is small. Therefore, the UEs of the first cell can be migrated to the second cell and the shared spectrum resource corresponding to the first cell can be allocated to the third cell, such that the third cell can exclusively use the shared spectrum resource, thereby improving the utilization of spectrum resources and reducing the waste of spectrum resources. In addition, by determining according to the first real-time load data of the first cell whether the first cell satisfies the migration condition, the case where the current load of the first cell is high and it is not suitable for migration can be identified, thereby improving the accuracy of the migration operation and reducing manpower required for network optimization.

Figure 4:
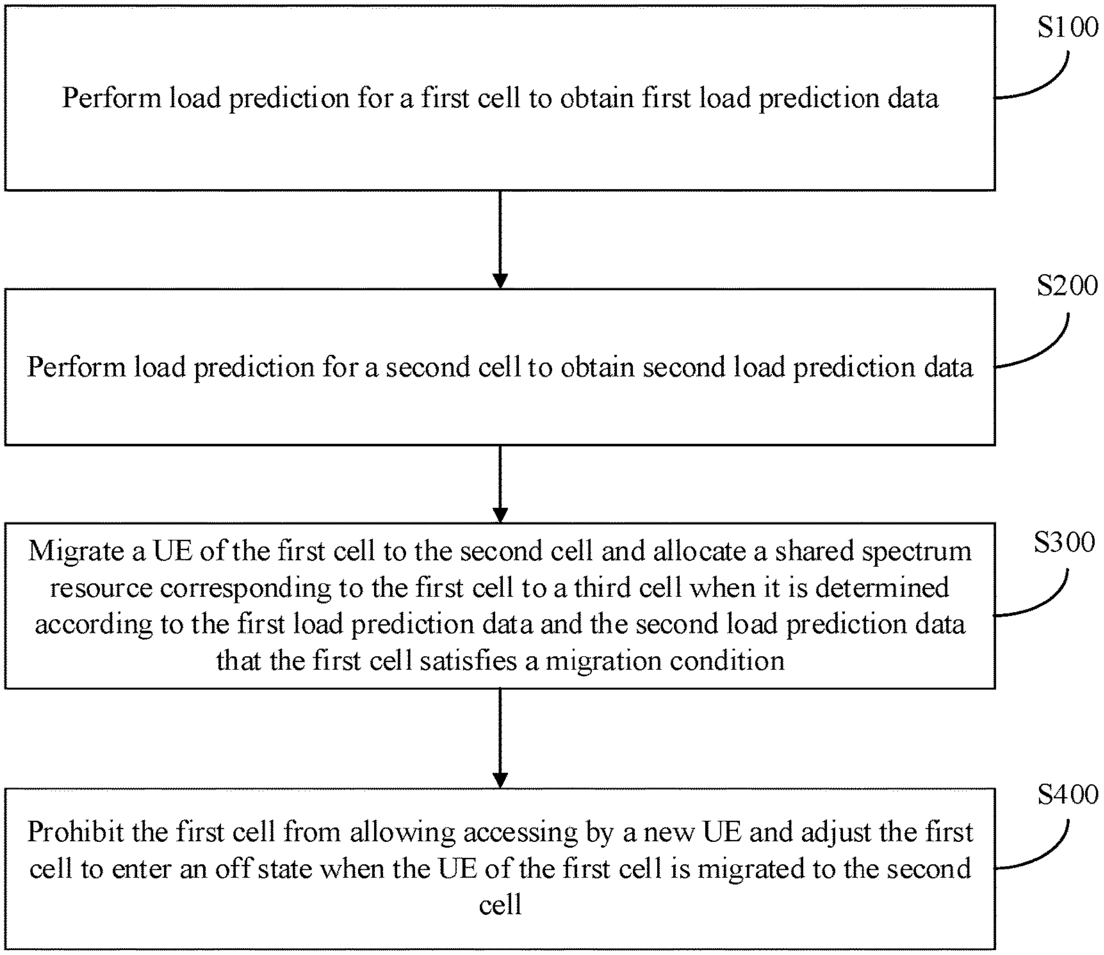
FIG. 4 is a schematic diagram of an implementation process of the method further including a step after S300 in FIG. 1.

Referring to FIG. 4, the method in the embodiment shown in FIG. 1 further includes, but not limited to, a following step S400 after S300.

At S400, the first cell is prohibited from allowing accessing by a new UE and the first cell is adjusted to enter an off state, when the UE of the first cell is migrated to the second cell.

It can be understood that after the UEs of the first cell are migrated to the second cell, the shared spectrum resource corresponding to the first cell is already allocated to the third cell. If a new UE accesses the first cell, but the first cell cannot provide a service to the new UE, use experience of the accessing user is affected. Therefore, the first cell is prohibited from allowing accessing by a new UE, i.e., no new UE can access the first cell and other UEs cannot be migrated to the first cell through other cells, so as not to affect the use experience of the accessing user. In the case where the first cell and the third cell share spectrum resources, the third cell with the high standard level needs to enable RE-level rate matching all the time to avoid signals such as a Cell Reference Signal (CRS) and a Demodulation Reference Signal (DMRS) frequently sent by the first cell with the low standard level, but RE-level rate matching causes a waste of spectrum resources in a scenario where the first cell with the low standard level configures a CRS. Therefore, the first cell is adjusted to enter the off state, i.e., the first cell is blocked and no longer sends any signal frequently sent by the first cell. As such, the third cell with the high standard level does not need to avoid any signal frequently sent by the first cell with the low standard level, thereby avoiding waste of spectrum resources and improving the utilization of the shared spectrum resource.

Figure 5:
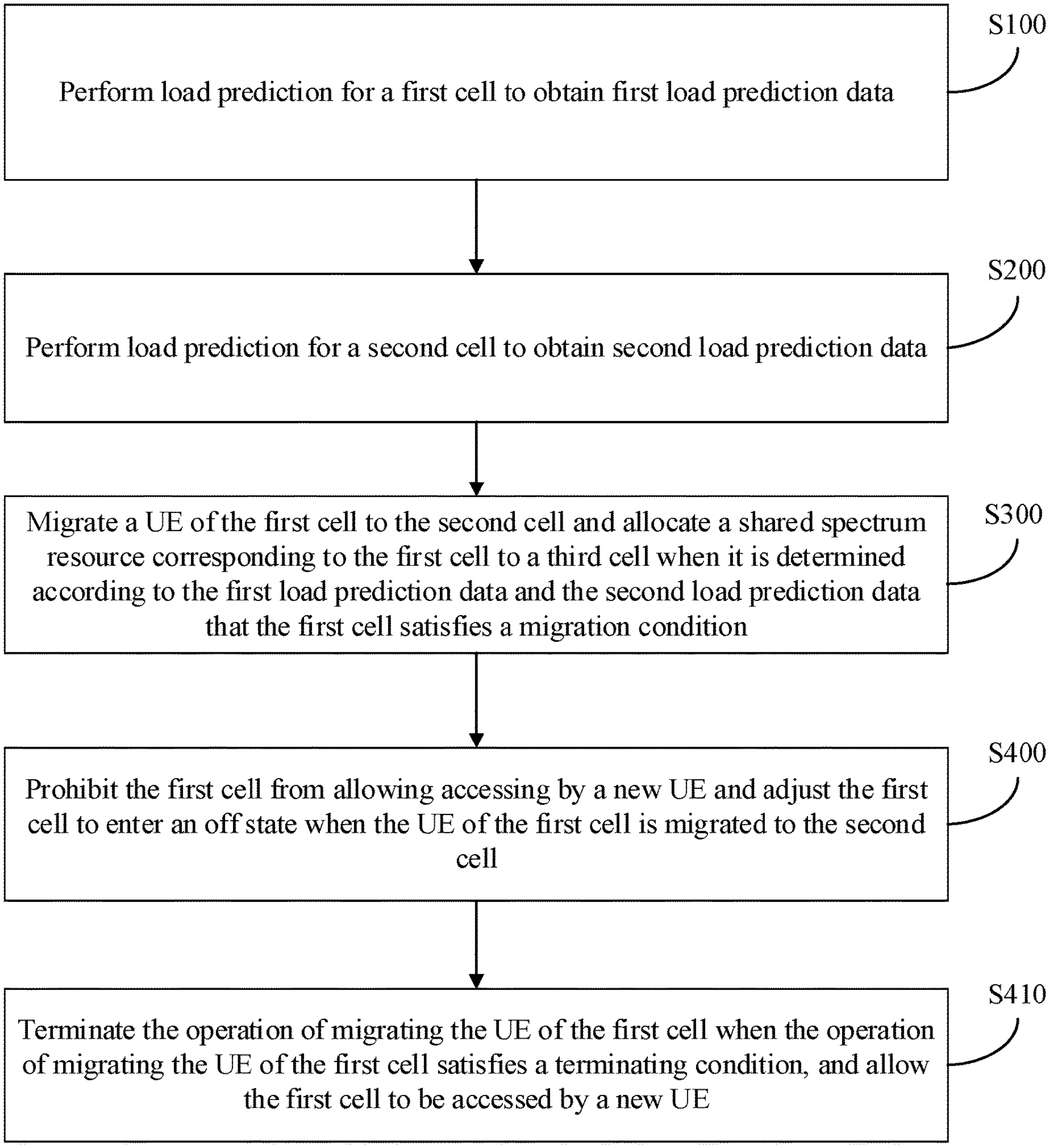
FIG. 5 is a schematic diagram of an implementation process of the method further including a step after S400 in FIG. 4.

Referring to FIG. 5, the method in the embodiment shown in FIG. 4 further includes, but not limited to, a following step S410 after S400.

At S410, when the operation of migrating the UE of the first cell satisfies a terminating condition, the operation of migrating the UE of the first cell is terminated and the first cell is allowed to be accessed by a new UE.

It can be understood that during the migration of the UEs of the first cell, migration of a UE may fail. If the UE migration is continued and the first cell is switched off, no service can be provided to the UE that has not been successfully migrated, and the use experience of the user is affected. Therefore, when it is detected during the migration of the UEs of the first cell that migration of any UE fails, it is considered that the operation of migrating the UEs of the first cell satisfies the terminating condition, the operation of migrating the UEs of the first cell is terminated, and the first cell is allowed to be accessed by a new UE. The terminating condition may also be that after a preset migration time, there is still a UE accessing the first cell. In addition, a UE that has been migrated out of the first cell may further be migrated back, i.e., the UE for which the migration operation has been completed may be re-migrated to the first cell. If it is necessary to wake up the first cell, i.e., adjust the first cell to enter an operating state after the first cell is adjusted to enter the off state, a signal frequently sent by the first cell is sent again, such that the first cell can provide a service to the UEs of the first cell, thereby ensuring the use experience of the users.

Figure 6:
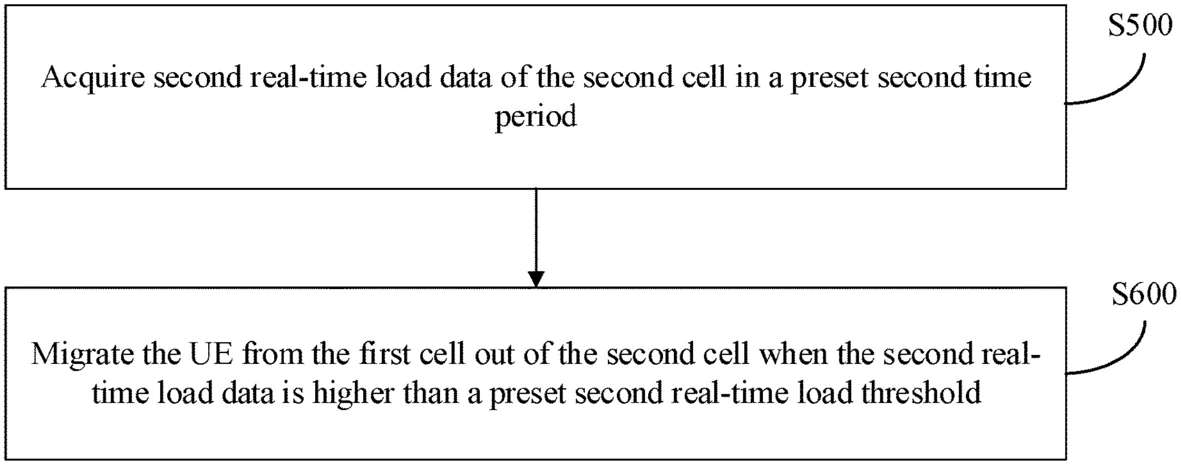
FIG. 6 is a schematic diagram of an implementation process of the method further including steps after S300 in FIG. 1.

Referring to FIG. 6, the method in the embodiment shown in FIG. 1 further includes, but not limited to, the following steps S500 and S600 after S300.

At S500, second real-time load data of the second cell in a preset second time period is acquired.

At S600, the UE from the first cell is migrated out of the second cell when the second real-time load data is higher than a preset second real-time load threshold.

It can be understood that after the UEs of the first cell are migrated to the second cell, the load of the second cell needs to be monitored in real time. If the UEs of the first cell are taken over by a plurality of second cells, the load of each of the second cells needs to be monitored in real time. The second real-time load data of the second cell in the preset second time period is acquired. If the second real-time load data is higher than the preset second real-time load threshold, it indicates that the load of the second cell is too high, and quality of service of the UEs of the second cell is affected. When the load of the second cell is too high, the UE accessing the second cell may experience latency or significant throughput deterioration, i.e., a deterioration degree of a specific indicator exceeds a preset threshold, seriously affecting the use experience of the users accessing the second cell. In this case, the UEs from the first cell are migrated out of the second cell, to reduce the load of the second cell, reduce the impact on the quality of service of the UEs of the second cell, and ensure the use experience of original users of the second cell and the users of the first cell that are migrated to the second cell. The second real-time load data may include a plurality of pieces of second unit load data. For example, the second cell is measured multiple times within the preset second time period to obtain a plurality of pieces of consecutive second unit load data. The second cell may be periodically measured multiple times in the preset second time period. For example, when the preset second time period is 100 seconds, the load of the second cell may be measured every 10 seconds, and 10 pieces of consecutive second unit load data are obtained. If the 10 pieces of consecutive second unit load data are all higher than the preset second real-time load threshold, it can be considered that the current load of the second cell is too high, and the quality of service of the UEs of the second cell and the use experience of the users are affected. Therefore, it is necessary to migrate the users from the first cell out of the second cell to reduce the load of the second cell. The UEs migrated from the first cell may be re-migrated to the first cell or another cell, and load prediction data of the cell responsible for taking over these UEs needs to be lower than the first takeover threshold. If some of the 10 pieces of consecutive second unit load data is lower than the preset second real-time load threshold, it can be considered that the current load of the second cell is normal, the impact on quality of service of the UEs of the second cell is in the acceptable range, and the second cell can take over the UEs from the first cell. In this case, the UEs do not need to be migrated out of the second cell. As such, the third cell can still exclusively use the shared spectrum resource, thereby improving the utilization of spectrum resources. In this way, the states of the cells, including spectrum resources occupied by each cell and the number of UEs accessing each cell, can be automatically adjusted, thereby improving the use experience of the users of the third cell with the high standard level while ensuring the use experience of the users of the first cell with the low standard level.

Figure 7:
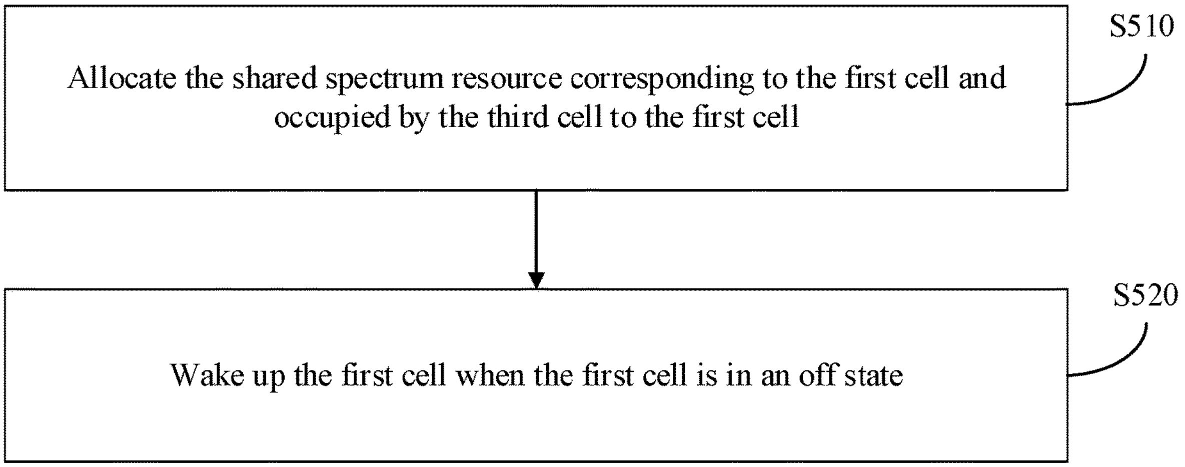
FIG. 7 is a schematic diagram of an implementation process of the method further including steps before S600 in FIG. 6.

Referring to FIG. 7, the method in the embodiment shown in FIG. 6 further includes, but not limited to, the following steps S510 and S520 before S600.

At S510, the shared spectrum resource corresponding to the first cell and occupied by the third cell is allocated to the first cell.

At S520, the first cell is woken up when the first cell is in an off state.

It can be understood that the first cell may be in the off state because the shared spectrum resource corresponding to the first cell is occupied by the third cell after the UEs of the first cell are migrated to the second cell. If the second real-time load data is higher than the preset second real-time load threshold, the UEs migrated from the first cell needs to be re-migrated to the first cell. However, the first cell not occupying any spectrum resource cannot provide a service to the UEs. Therefore, the shared spectrum resource corresponding to the first cell and occupied by the third cell needs to be re-allocated to the first cell, such that the first cell can provide a service to the UEs migrated back to the first cell, thereby ensuring the use experience of the users. In addition, when the first cell is in the off state, no signal frequently sent by the first cell is sent, and the normal use of the users is affected. In this case, the first cell needs to be woken up to re-send signals frequently sent by the first cell, such as a CRS and a DMRS. As such, the first cell operates normally to ensure the use experience of the users. In this way, the states of the cells can be automatically adjusted to adjust the spectrum resource occupied by each cell, thereby reducing manpower required for network optimization.

Figure 8:
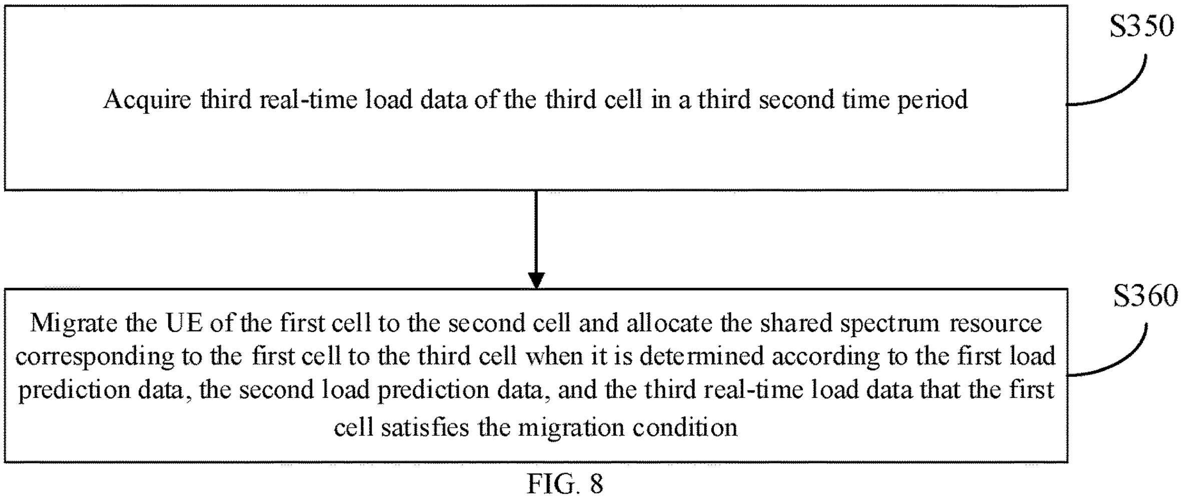
FIG. 8 is a schematic diagram of an implementation process of the method further including steps after S300 in FIG. 1.

Referring to FIG. 8, S300 in the embodiment shown in FIG. 1 further includes, but not limited to, the following steps S350 and S360.

At S350, third real-time load data of the third cell in a third second time period is acquired.

At S360, the UE of the first cell is migrated to the second cell and the shared spectrum resource corresponding to the first cell is allocated to the third cell, when it is determined according to the first load prediction data, the second load prediction data, and the third real-time load data that the first cell satisfies the migration condition.

The migration condition further includes that the third real-time load data is higher than a preset third real-time load threshold.

It can be understood that the migration of the UEs of the first cell is for the purpose of improving the use experience of the users of the cell with the high standard level and improving the utilization of spectrum resources. If the load of the third cell is low, i.e., the number of UEs currently accessing the third cell is small, and all the UEs of the first cell are migrated, the third cell with a small number of UEs exclusively uses the shared spectrum resource, and the utilization rate of the shared spectrum resource is reduced. Therefore, it needs to be determined whether it is necessary for the third cell to exclusively use the shared spectrum resource in the current state. For example, the third real-time load data of the third cell in the preset third time period is acquired, and it is determined whether the third real-time load data is higher than the preset third real-time load threshold. If the third real-time load data is higher than the preset third real-time load threshold, it can be considered that the current load of the third cell is high, i.e., the number of UEs accessing the third cell is large, and a large number of spectrum resources need to be occupied to meet the use experience of the users of the third cell with the high standard level. Therefore, it is necessary to migrate the UEs of the first cell to the second cell and allocate the shared spectrum resource corresponding to the first cell to the third cell, such that the third cell exclusively uses the shared spectrum resource, thereby meeting the use requirements of the users of the third cell with the high standard level. By adjusting the spectrum resources of the first cell according to the real-time load data of the cell with the high standard level, the accuracy of adjustment can be improved, erroneous allocation of spectrum resources can be avoided, and the utilization of spectrum resources can be improved.

To more clearly describe the steps and processes of the spectrum sharing method in the above embodiments, examples are given below.

Figure 9:
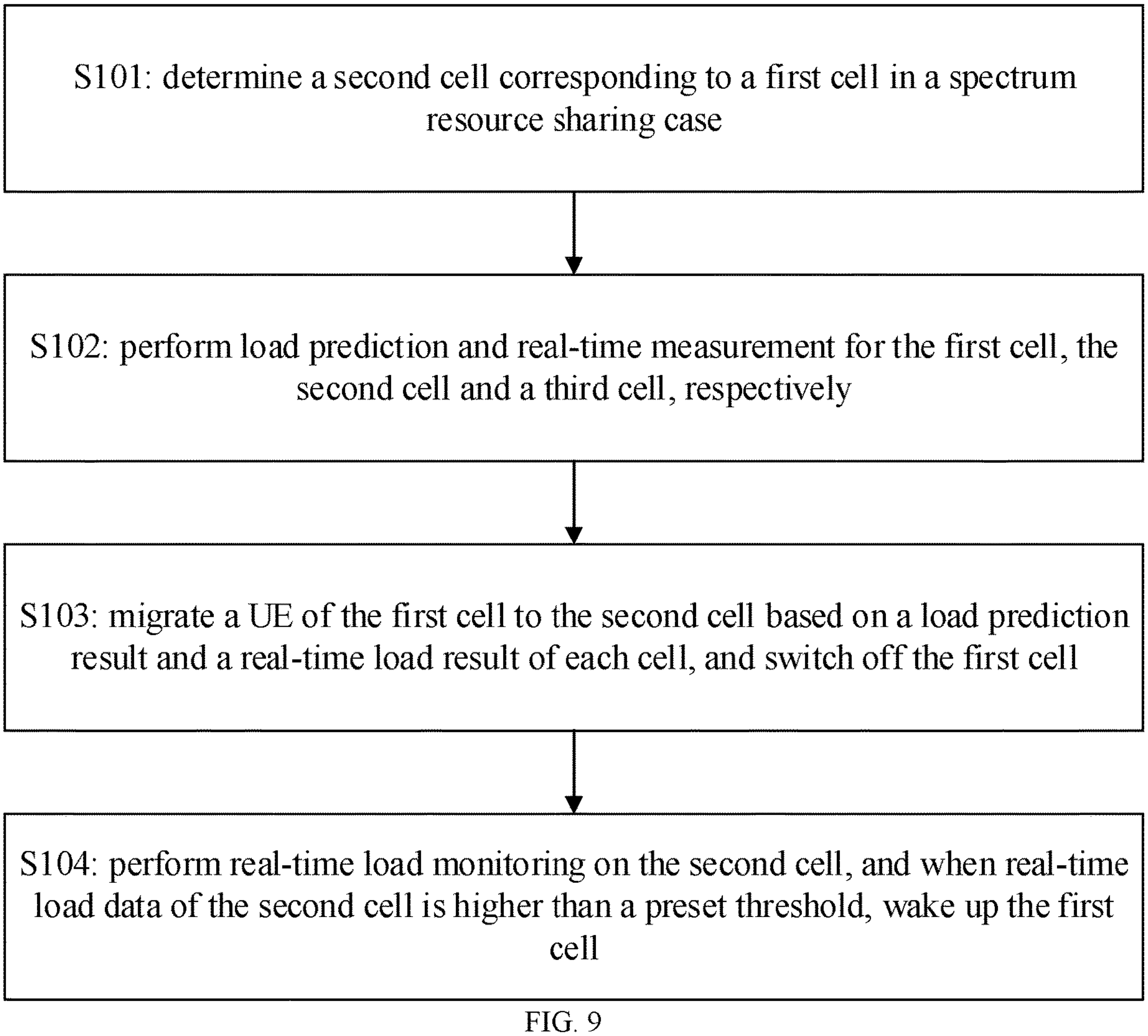
FIG. 9 is a flowchart of steps of a spectrum sharing method according to an embodiment of the present disclosure.

FIG. 9 is a flowchart of steps of a spectrum sharing method according to an embodiment of the present disclosure. The method includes the following steps S101, S102, S103, and S104.

At S101, a second cell corresponding to a first cell in a spectrum resource sharing case is determined.

At S102, load prediction and real-time measurement are performed for the first cell, the second cell and a third cell, respectively.

At S103, based on a load prediction result and a real-time load result of each cell, a UE of the first cell is migrated to the second cell, and the first cell is switched off.

At S104, real-time load monitoring is performed on the second cell, and when real-time load data of the second cell is higher than a preset threshold, the first cell is woken up.

It can be understood that a shared spectrum resource refers to a spectrum resource shared by a plurality of cells with different standard levels, e.g., SS and DSS, and the same spectrum resource used simultaneously by a 4G cell and a 5G cell at adjacent spatial locations. The first cell refers to a cell with a low standard level among the plurality of cells sharing the spectrum resource. The second cell refers to a cell for taking over the UE of the first cell after the first cell is switched off. The number of second cells may be one or more. A standard level of the second cell may be equal to or lower than a standard level of the first cell.

Load prediction is respectively performed for the first cell, the second cell, and the third cell. The load prediction data includes, but not limited to, uplink and downlink PRB utilization rates, a number of RRC users, a number of activated UEs, etc. In addition, the load prediction may be performed using any time series algorithm.

Based on the load prediction result and the real-time load result of each cell, if the UEs of the first cell can be completely taken over by the second cell, the UEs of the first cell are migrated to the second cell. Then, the first cell is switched off, and the first spectrum resource occupied by the first cell is allocated to the third cell. In this way, the third cell can occupy more spectrum resources, thereby improving the use experience of users in the cell with the high standard level. Switching off a cell means blocking the cell and no longer sending any signal frequently sent by the cell.

After the first cell is switched off, the load of the second cell taking over the UEs of the first cell needs to be monitored in real time. If it is found that the load of the second cell is too high and affects quality of service of the UEs, the first cell is woken up, and the UEs of the first cell are re-migrated to the first cell, thereby ensuring the use experience of users of the first cell and the second cell.

Figure 10:
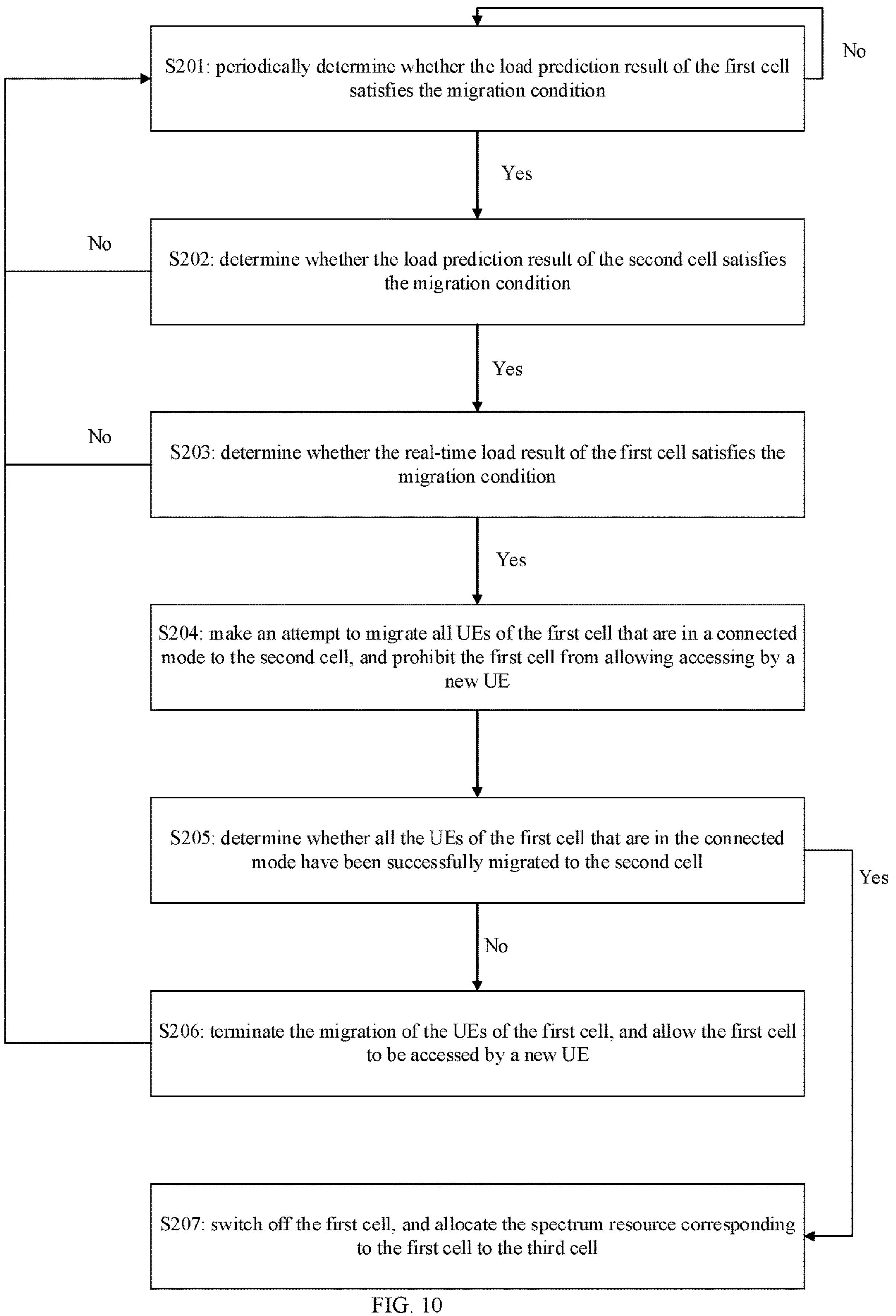
FIG. 10 is a flowchart of steps of migrating a UE of a first cell based on a load prediction result and a real-time load result of each cell according to an embodiment of the present disclosure.

FIG. 10 is a flowchart of steps of migrating a UE of a first cell based on a load prediction result and a real-time load result of each cell according to an embodiment of the present disclosure. The method includes the following steps S201, S202, S203, S204, S205, S206, and S207.

At S201, it is periodically determined whether the load prediction result of the first cell satisfies the migration condition.

At S202, it is determined whether the load prediction result of the second cell satisfies the migration condition.

At S203, it is determined whether the real-time load result of the first cell satisfies the migration condition.

At S204, an attempt is made to migrate all UEs of the first cell that are in a connected mode to the second cell, and the first cell is prohibited from allowing accessing by a new UE.

At S205, it is determined whether all the UEs of the first cell that are in the connected mode have been successfully migrated to the second cell. If yes, S207 is executed. If not, S206 is executed.

At S206, the migration of the UEs of the first cell is terminated, the first cell is allowed to be accessed by a new UE, and S201 is performed.

At S207, the first cell is switched off, and the spectrum resource corresponding to the first cell is allocated to the third cell.

It can be understood that periodically determining whether the load prediction result of the first cell satisfies the migration condition may be performed every 15 minutes or 1 hour. The migration condition includes that the load prediction result is lower than a preset off threshold. If the load prediction result of the first cell satisfies the migration condition, it is determined whether the impact on quality of service of the UEs of the second cell for taking over the UEs of the first cell is acceptable after the first cell is switched off. Whether the impact on quality of service of the UEs is acceptable is determined based on whether the load prediction results of the second cells are all lower than a set takeover threshold after the first cell is switched off. It should be noted that the off threshold and the takeover threshold may be different. The load of the second cell after the first cell is switched off is calculated based on the load prediction result of the first cell, the load prediction result of the second cell, and an overlapping coverage degree of the second cell and the first cell. The overlapping coverage degree may be a preset value, or may be automatically calculated based on a signal strength of a current cell and a neighboring cell actually measured and reported by the UE. If the load prediction result of the first cell satisfies the migration condition and the impact on quality of service of the UEs of the second cell is acceptable after the first cell is switched off, it is determined whether the real-time load result of the first cell satisfies the migration condition. Otherwise, the load prediction result of the first cell is re-acquired, and it is determined whether the re-acquired load prediction result satisfies the migration condition.

It is determined whether the real-time load result of the first cell satisfies the migration condition. The migration condition includes that the real-time load result is lower than a preset first real-time load threshold. It should be noted that the first real-time load threshold, the off threshold, and the takeover threshold may have different values. The real-time load result may include a plurality of small-granularity unit historical loads. For example, the load status is measured every 10 seconds within 30 seconds. That the real-time load result satisfies the migration condition may be considered that the number of unit historical loads lower than a preset threshold among the plurality of unit historical loads exceeds a preset proportion. If the real-time load result satisfies the migration condition, an attempt is made to migrate all the UEs of the first cell that are in a connected mode to the second cell. Otherwise, the load prediction result of the first cell is re-acquired, and it is determined whether the re-acquired load prediction result satisfies the migration condition.

Figure 11:
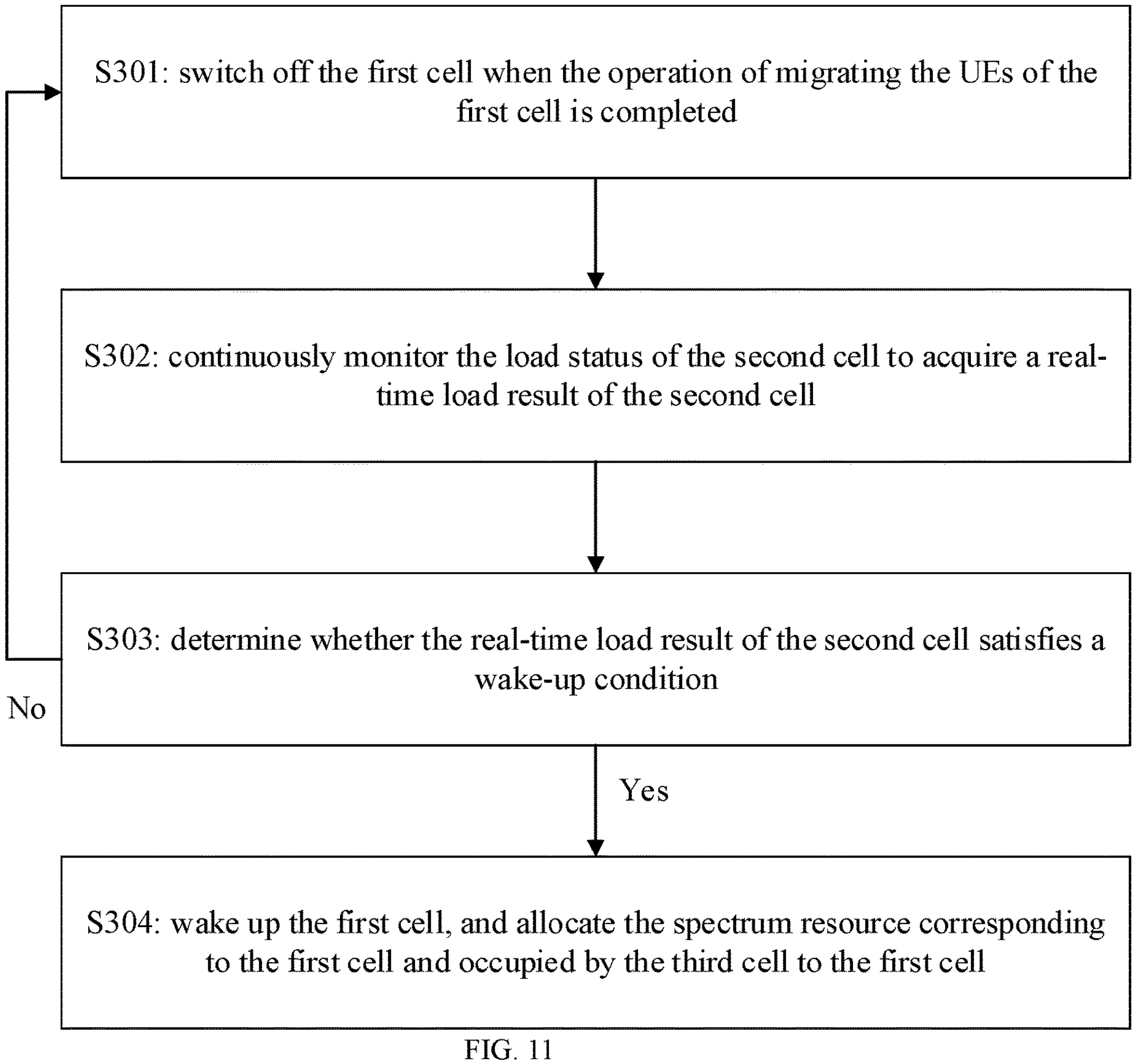
FIG. 11 is a flowchart of steps of waking up a first cell according to an embodiment of the present disclosure.

FIG. 11 is a flowchart of steps of waking up a first cell according to an embodiment of the present disclosure. The process includes the following steps S301, S302, S303, and S304.

At S301, when the operation of migrating the UEs of the first cell is completed, the first cell is switched off.

At S302, the load status of the second cell is continuously monitored to acquire a real-time load result of the second cell.

At S303, it is determined whether the real-time load result of the second cell satisfies a wake-up condition. If yes, S304 is executed. If not, S302 is executed.

At S304, the first cell is woken up, and the spectrum resource corresponding to the first cell and occupied by the third cell is allocated to the first cell.

It can be understood that after the first cell is switched off, the load of the second cell taking over the UEs of the first cell needs to be monitored in real time. If it is found that the load of the second cell is too high and affects quality of service of the UEs, the first cell is woken up. The real-time load data of each cell includes, but not limited to, an uplink/downlink PRB utilization rate, a number of RRC users, a number of activated UEs, etc. That the load is too high and affects quality of service of the UEs means that because the load of the cell is too high, the UE experiences latency or significant throughput deterioration. The significant deterioration means that a deterioration degree of a specific indicator exceeds a preset threshold. Waking up the first cell means unblocking the cell and re-sending all frequently sent signals, and allocating the spectrum resource of the first cell occupied by the third cell back to the first cell.

Figure 12:
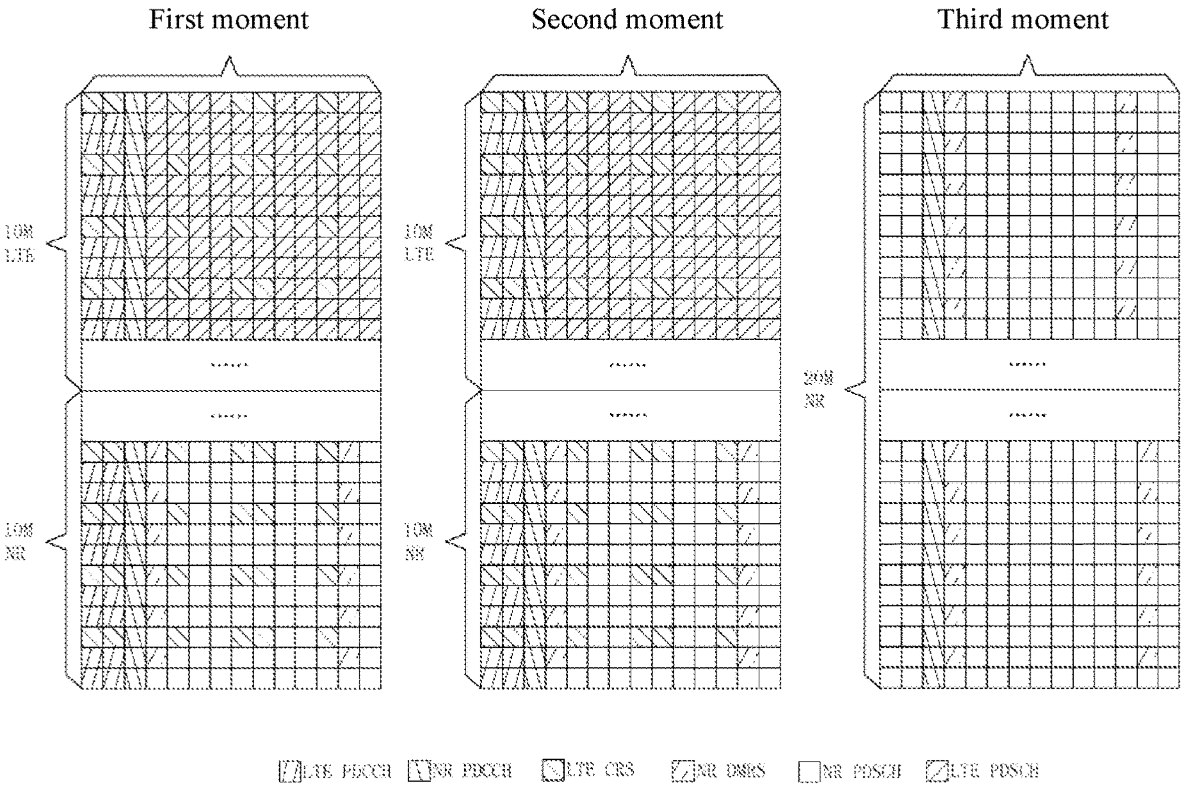
FIG. 12 is a schematic diagram of a resource allocation process in a spectrum sharing case according to an embodiment of the present disclosure.

FIG. 12 is a schematic diagram of a resource allocation process in a spectrum sharing case according to an embodiment of the present disclosure. FIG. 12 is used to characterize the allocation of Physical Downlink Control Channels (PDCCHs), frequently sent signals, and Physical Downlink Shared Channels (PDSCHs) of Long Term Evolution (LTE) and New Radio (NR) in the spectrum sharing case.

It can be understood that 20 M spectrum resources are shared by an LTE cell and an NR cell through spectrum sharing. The NR cell occupies low-frequency 10 M spectrum resources and is defined as a third cell. The LTE cell occupies high-frequency 10 M spectrum resources and is defined as a first cell. An inter-frequency co-coverage 10 M intra-RAT basic coverage cell is defined as a second cell. The second cell can take over UEs of the first cell.

An uplink PRB utilization rate and a downlink PRB utilization rate of each of the third cell, the first cell, and the second cell are respectively predicted. For example, based a prediction granularity of 15 minutes, it is predicted at a first moment that in the next hour, four predicted uplink PRB utilization rates of the first cell are 5%, 6%, 4%, and 8%, and four predicted downlink PRB utilization rates of the first cell are 30%, 50%, 55%, and 60%. Based a prediction granularity of 15 minutes, it is predicted at the first moment that in the next hour, four predicted uplink PRB utilization rates of the second cell are 5%, 6%, 4%, and 8%, and four predicted downlink PRB utilization rates of the second cell are 30%, 50%, 55%, and 60%. After 1 hour, it is predicted at a second moment that in the next hour, four predicted uplink PRB utilization rates of the first cell are 7%, 10%, 2%, and 3%, and four predicted downlink PRB utilization rates of the first cell are 20%, 30%, 35%, and 10%. It is predicted at the second moment that in the next hour, four predicted uplink PRB utilization rates of the second cell are 5%, 3%, 4%, and 8%, and four predicted downlink PRB utilization rates of the second cell are 10%, 20%, 15%, and 30%.

For example, it is determined every 15 minutes whether the load of the first cell satisfies an off threshold. The off threshold for the first cell is that neither the uplink PRB utilization rate nor the downlink PRB utilization rate exceeds 50% in the next hour. In this case, at the first moment, no user migration is performed, and the first cell is not switched off. After 1 hour, the load of the first cell satisfies the off threshold for the cell. In other words, within one hour after the first moment, the load of the first cell is determined three times, and none of the three load measurement results satisfies the off threshold for the cell. When the first cell is switched off, a load prediction result of the second cell is acquired. A sum of the PRB utilization rates of the first cell and the second cell may be used as the load prediction result of the second cell. For example, after the first cell is switched off, it is predicted based on a prediction granularity of 15 minutes that in the next hour, four predicted uplink PRB utilization rates of the second cell are 12%, 13%, 6%, and 11%, and four predicted downlink PRB utilization rates of the second cell are 30%, 50%, 50%, and 40%. If a threshold for the second cell to ensure that quality of service of UEs is acceptable is that the uplink PRB utilization rate and the downlink PRB utilization rate are both 60%, it is determined at the second moment that switching off of the first cell can be performed, and the first cell can be switched off for one hour according to the prediction result.

After it is determined that switching off of the first cell can be performed, historical load data of the first cell obtained in latest three measurements based on the granularity of 10 seconds is acquired. For example, the acquired historical load data is that the uplink PRB utilization rates are 5%, 16%, and 4%, and the downlink PRB utilization rates are 60%, 20%, and 55%. If a cell off condition is that none of real-time uplink and downlink PRB utilization rates exceeds 60% in the historical load data obtained in the latest three measurements, the first cell satisfies the cell off condition.

At a third moment, all UEs of the first cell that are in a connected mode are migrated to the second cell, and the first cell is prohibited from allowing accessing by a new UE.

After all users accessing the first cell are successfully migrated to the second cell, i.e., after the third moment, the real-time load data of the second cell is monitored in real time. For example, if it is found that the uplink PRB or downlink PRB utilization rates in historical load data obtained in 10 consecutive measurements based on the granularity of 10 seconds exceed 70%, the first cell is woken up immediately. A resource allocation policy for the shared 20 M bandwidth after the first cell is woken up is the same as the resource allocation policy at the first moment, i.e., the resource allocation policy in the initial state is used.

Figure 13:
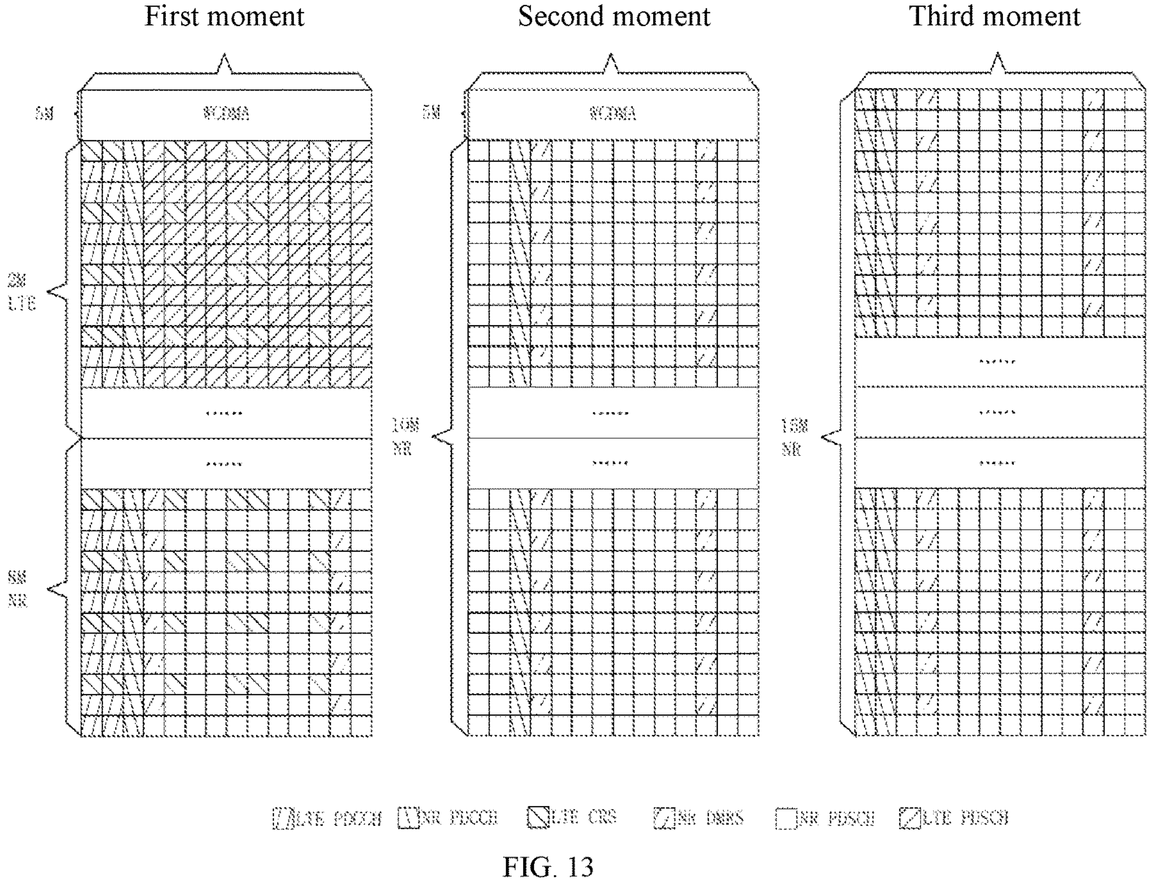
FIG. 13 is a schematic diagram of a resource allocation process in a dynamic spectrum resource sharing case according to an embodiment of the present disclosure.

FIG. 13 is a schematic diagram of a resource allocation process in a dynamic spectrum resource sharing case according to an embodiment of the present disclosure. FIG. 13 is used to characterize the allocation of PDCCHs, frequently sent signals, and PDSCHs of Wideband Code Division Multiple Access (WCDMA), LTE, and NR in the dynamic spectrum sharing case.

It can be understood that 15 M spectrum resources are shared by an LTE cell, an NR cell, and a WCDMA cell through dynamic spectrum sharing. The NR cell and the LTE cell share low-frequency 10 M spectrum resources and are respectively defined as a third cell and a first migration cell. The WCDMA cell occupies high-frequency 5 M spectrum resources and is defined as a second migration cell. For example, second cells for taking over UEs of the first migration cell include two inter-frequency 10 M intra-RAT basic coverage cells having different coverage, which are respectively defined as a first takeover cell and a second takeover cell. A second cell for taking over UEs of the second migration cell is an inter-frequency co-coverage 5 M intra-RAT basic coverage cell, and is defined as a third takeover cell.

An uplink PRB utilization rate, a downlink PRB utilization rate, and a number of RRC users of each of the third cell, the first migration cell, the first takeover cell, the second takeover cell, the second migration cell, and the third takeover cell are respectively predicted. For example, based on a prediction granularity of 15 minutes, load prediction data of the cells are as follows.

It is predicted at a first moment that in the next hour, four predicted uplink PRB utilization rates of the first migration cell are 5%, 6%, 4%, and 8%, four predicted downlink PRB utilization rates of the first migration cell are 30%, 20%, 15%, and 30%, and four predicted numbers of RRC users of the first migration cell are 10, 8, 7, and 10.

It is predicted at the first moment that in the next hour, four predicted uplink PRB utilization rates of the first takeover cell are 2%, 3%, 4%, and 5%, four predicted downlink PRB utilization rates of the first takeover cell are 10%, 10%, 25%, and 10%, and four predicted numbers of RRC users of the first takeover cell are 4, 4, 7, and 5.

It is predicted at the first moment that in the next hour, four predicted uplink PRB utilization rates of the second takeover cell are 5%, 6%, 4%, and 8%, four predicted downlink PRB utilization rates of the second takeover cell are 10%, 10%, 25%, and 10%, and four predicted numbers of RRC users of the second takeover cell are 4, 4, 7, and 5.

It is predicted at the first moment that four predicted numbers of users of the second migration cell in the next hour are 2, 8, 7 and 4.

It is predicted at the first moment that four predicted numbers of users of the third takeover cell in the next hour are 4, 4, 7, and 5.

After one hour, i.e., at a second moment, load prediction is performed for each cell again based on a prediction granularity of 15 minutes. Load prediction data of the cells are as follows.

It is predicted at the second moment that in the next hour, four predicted uplink PRB utilization rates of the first migration cell are 3%, 6%, 4%, and 1%, four predicted downlink PRB utilization rates of the first migration cell are 10%, 20%, 15%, and 10%, and four predicted numbers of RRC users of the first migration cell are 10, 8, 7, and 10.

It is predicted at the second moment that in the next hour, four predicted uplink PRB utilization rates of the first takeover cell are 2%, 3%, 4%, and 5%, four predicted downlink PRB utilization rates of the first takeover cell are 5%, 10%, 5%, and 10%, and four predicted numbers of RRC users of the first takeover cell are 4, 4, 7, and 5.

It is predicted at the second moment that in the next hour, four predicted uplink PRB utilization rates of the second takeover cell are 5%, 16%, 4%, and 8%, four predicted downlink PRB utilization rates of the second takeover cell are 10%, 10%, 5%, and 10%, and four predicted numbers of RRC users of the second takeover cell are 4, 4, 7, and 5.

It is predicted at the second moment that four predicted numbers of users of the second migration cell in the next hour are 2, 3, 2 and 4.

It is predicted at the second moment that four predicted numbers of users of the third takeover cell in the next hour are 1, 1, 1, and 1.

It is assumed that an off threshold for the first migration cell is that in the next hour, neither the uplink PRB utilization rate nor the downlink PRB utilization rate exceeds 50%, and the number of RRC users does not exceed 10. The load of the first migration cell satisfies the off threshold for the cell at the first moment, and will satisfy the off threshold for the next two consecutive hours. Because there are two second cells for taking over the UEs of the first migration cell, namely, the first takeover cell and the second takeover cell, it may be considered that the UEs of the first migration cell are evenly migrated to the first takeover cell and the second takeover cell, and half of the value of the load prediction data of the first migration cell may be respectively added to the load prediction data of the first takeover cell and the load prediction data of the second takeover cell to obtain a first takeover prediction result and a second takeover prediction result. To be specific, after the first migration cell is switched off, the uplink PRB utilization rates of the first takeover cell will be 4.5%, 6%, 6%, 9%, 3.5%, 6%, 6%, and 5.5%, the downlink PRB utilization rates of the first migration cell will be 25%, 20%, 32.5%, 25%, 10%, 20%, 12.5%, and 15%, and the numbers of RRC users of the first migration cell will be 9, 8, 10.5, 10, 9, 8, 10.5, and 10 in the next two hours. After the first migration cell is switched off, the uplink PRB utilization rates of the second takeover cell will be 7.5%, 9%, 6%, 12%, 6.5%, 19%, 6%, and 8.5%, the downlink PRB utilization rates of the second migration cell will be 25%, 20%, 32.5%, 25%, 15%, 20%, 12.5%, and 15%, and the numbers of RRC users of the second migration cell will be 9, 8, 10.5, 10, 9, 8, 10.5, and 10 in the next two hours. It is assumed that a threshold for the first takeover cell and the second takeover cell to ensure that quality of service of UEs is acceptable is that neither the uplink PRB utilization rate nor the downlink PRB utilization rate exceeds 60%, and the number of RRC users does not exceed 12. Therefore, it is determined at the first moment that switching off of the first cell can be performed, and the first cell can be maintained in the off state for two hours.

For another example, an off threshold for the second migration cell is that the number of users should not exceed 5 in the next hour. At the first moment, the load of the second migration cell does not satisfy the off threshold for the cell. After one hour, i.e., at the second moment, the load of the second migration cell satisfies the off threshold for the cell. A sum of the load prediction data of the second migration cell and the load prediction data of the third takeover cell may be used as a prediction result of the third takeover cell after taking over the UEs of the second migration cell. To be specific, after the second migration cell is switched off, four predicted numbers of users of the third takeover cell in the next hour are 3, 4, 3, and 5. If a threshold for the third takeover cell to ensure that quality of service of UEs is acceptable is that the number of users does not exceed 6, it is determined at the second moment that switching off of the second migration cell can be performed, and the second migration cell can be maintained in the off state for one hour.

After it is determined that switching off of the first migration cell can be performed, historical load data of the first migration cell obtained in latest three measurements based on the granularity of 10 seconds is acquired. For example, the acquired historical load data is that the uplink PRB utilization rates are 5%, 16%, and 4%, the downlink PRB utilization rates are 60%, 20%, and 55%, and the numbers of RRC users are 10, 2, and 9. If a cell off condition is that none of real-time uplink and downlink PRB utilization rates exceeds 60% and the number of RRC users does not exceed 12 in the historical load data obtained in the latest three measurements, the first migration cell satisfies the cell off condition.

After it is determined that switching off of the second migration cell can be performed, historical load data of the second migration cell obtained in latest five measurements based on the granularity of 10 seconds is acquired. For example, the numbers of users acquired are 6, 2, 1, 5, and 3. If a cell off condition is that the number of RRC users does not exceed 8 in the historical load data obtained in the latest five measurements, the second migration cell satisfies the cell off condition.

At the second moment, all UEs of the first migration cell that are in a connected mode are migrated to the first takeover cell and the second takeover cell, and the first migration cell is prohibited from allowing accessing by a new UE.

At a third moment, all UEs of the second migration cell that are in a connected mode are migrated to the third takeover cell, and the second migration cell is prohibited from allowing accessing by a new UE.

After the UEs of the first migration cell are successfully migrated and the first migration cell is switched off, all resources on the 10 M bandwidth are used by the third cell. After the UEs of the second migration cell are successfully migrated and the second migration cell is switched off, all resources on the 15 M bandwidth are used by the third cell.

After the UEs of the first migration cell are successfully migrated and the first migration cell is switched off, i.e., after the second moment, the real-time load data of the first takeover cell and the second takeover cell are continuously monitored. For example, if it is found that the uplink PRB or downlink PRB utilization rates in historical load data of the first takeover cell or the second takeover cell obtained in 10 consecutive measurements based on the granularity of 10 seconds exceed 70% or the numbers of RRC users in the historical load data exceed 20, the first migration cell is woken up immediately. A resource allocation policy for the shared 10 M bandwidth after the first cell is woken up is the same as the resource allocation policy at the first moment, i.e., the resource allocation policy at the initial state is used.

After the UEs of the second migration cell are successfully migrated and the second migration cell is switched off, i.e., after the third moment, the real-time load data of the third takeover cell is continuously monitored. For example, if it is found that the numbers of RRC users in historical load data of the third takeover cell obtained in 10 consecutive measurements based on the granularity of 10 seconds exceed 15, the second migration cell is woken up immediately. Two resource allocation policies may be used for the shared 15 M bandwidth after the second migration cell is woken up. One is the same as the resource allocation policy at the first moment, i.e., the resource allocation policy in the initial state is used. The other is the same as the resource allocation policy at the second moment, i.e., the resource allocation policy before the migration of the UEs of the second migration cell is used.

Figure 14:
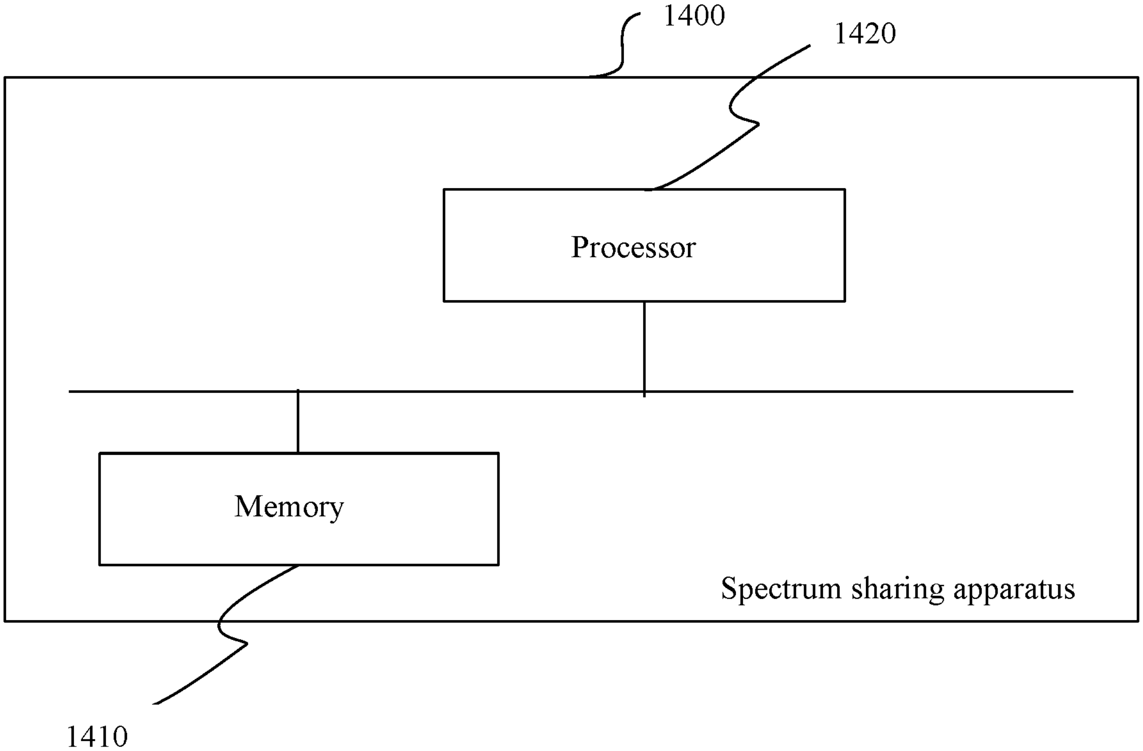
FIG. 14 is a schematic structural diagram of a network management system according to an embodiment of the present disclosure.

FIG. 14 shows a spectrum sharing apparatus 1400 according to an embodiment of the present disclosure. The spectrum sharing apparatus 1400 includes a memory 1410, a processor 1420, and a computer program stored in the memory 1410 and executable by the processor 1420. The computer program, when executed by the processor 1420, causes the processor 1420 to implement the spectrum sharing method in the above embodiments.

The memory 1410, as a non-transitory computer-readable storage medium, may be configured for storing a non-transitory software program and a non-transitory computer-executable program, for example, the spectrum sharing method in the embodiments of the present disclosure. The processor 1420 runs the non-transitory software program and the non-transitory computer-executable program stored in the memory 1410, to implement the spectrum sharing method in the embodiments of the present disclosure.

The memory 1410 may include a program storage area and a data storage area. The program storage area may store an operating system, and an application required by at least one function. The storage data area may store data and the like required for executing the spectrum sharing method in the embodiments of the present disclosure. In addition, the memory 1410 may include a high-speed random access memory, and may also include a non-transitory memory, e.g., at least one magnetic disk storage device, flash memory device, or other non-transitory solid-state storage device. It should be noted that the memory 1410 may include memories 1410 located remotely from the processor 1420, and the remote memories 1410 may be connected to the terminal device via a network. Examples of the network include, but not limited to, the Internet, an intranet, a local area network, a mobile communication network, and combinations thereof.

The non-transitory software program and the non-transitory computer-executable program required for implementing the spectrum sharing method in the embodiments are stored in the memory which, when executed by one or more processors, causes the one or more processors to implement the spectrum sharing method in the embodiments, for example, implement the method steps S100 to S300 in FIG. 1, the method steps S310 to S320 in FIG. 2, the method steps S330 to S340 in FIG. 3, the method step S400 in FIG. 4, the method step S410 in FIG. 5, the method steps S500 to S600 in FIG. 6, the method steps S510 to S520 in FIG. 7, or the method steps S350 to S360 in FIG. 8.

The present disclosure further provides a computer-readable storage medium, storing a computer-executable instruction which, when executed by a computer, causes the computer to implement the spectrum sharing method in the embodiments, for example, implement the method steps S100 to S300 in FIG. 1, the method steps S310 to S320 in FIG. 2, the method steps S330 to S340 in FIG. 3, the method step S400 in FIG. 4, the method step S410 in FIG. 5, the method steps S500 to S600 in FIG. 6, the method steps S510 to S520 in FIG. 7, or the method steps S350 to S360 in FIG. 8.

The apparatus embodiments described above are merely examples. The units described as separate components may or may not be physically separated, i.e., they may be located in one place or may be distributed over a plurality of network units. Some or all of the modules may be selected according to actual needs to achieve the objects of the scheme of this embodiment.

An embodiment of the present disclosure includes: performing load prediction for a first cell to obtain first load prediction data; performing load prediction for a second cell to obtain second load prediction data; and migrating a UE of the first cell to the second cell and allocating a shared spectrum resource corresponding to the first cell to a third cell, when it is determined according to the first load prediction data and the second load prediction data that the first cell satisfies a migration condition, where a standard level of the first cell is higher than or equal to a standard level of the second cell, and a standard level of the third cell is higher than the standard level of the first cell. According to the scheme provided in the embodiments of the present disclosure, the first cell and the third cell share a first spectrum resource, the second cell occupies a second spectrum resource, the standard level of the first cell is lower than that of the third cell, and the standard level of the first cell is higher than or equal to that of the second cell. The first load prediction data of the first cell and the second load prediction data of the second data are acquired to determine future load states of the first cell and the second cell. It is determined whether the second cell can completely take over the future load of the first cell, so as to determine whether the first cell satisfies the migration condition. When the first cell satisfies the migration condition, it is considered that the second cell can completely take over the load caused by the UEs of the first cell without affecting quality of service of UEs of the second cell, all the UEs of the first cell are migrated to the second cell, and at the same time, the shared spectrum resource corresponding to the first cell can be allocated to the third cell. Therefore, by performing load prediction for the first cell and the second cell, spectrum resources occupied by each cell can be adjusted according to the future load states of the first cell and the second cell. The second cell with a standard level lower than or equal to the standard level of the first cell provides spectrum resources to the UEs of the first cell, to ensure the experience of the users of the first cell. As such, the third cell with a standard level higher than the standard level of the first cell can exclusively use the shared spectrum resource, thereby improving the experience of users of the third cell. In this way, spectrum resources occupied by the cells can be automatically adjusted, thereby improving the accuracy of adjustment, reducing manpower required for network optimization, and improving the use experience of the users with the high standard level in the case of spectrum sharing.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of data (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired data and which can be accessed by a computer. In addition, as is known to those having ordinary skills in the art, the communication medium typically includes computer-readable instructions, data structures, program modules, or other data in a modulated data signal such as a carrier or other transport mechanism, and can include any data delivery medium.

The embodiments of the present disclosure have been described in detail above in conjunction with the accompanying drawings, but the present disclosure is not limited to the above embodiments, and various changes may be made within the knowledge of those having ordinary skills in the art without departing from the protection scope of the present disclosure.

What is claimed is:

1. A spectrum sharing method, comprising:

performing load prediction for a first cell to obtain first load prediction data;

performing load prediction for a second cell to obtain second load prediction data; and migrating a User Equipment (UE) of the first cell to the second cell and allocating a shared spectrum resource corresponding to the first cell to a third cell, in response to determining according to the first load prediction data and the second load prediction data that the first cell satisfies a migration condition, wherein a standard level of the first cell is higher than or equal to a standard level of the second cell, and a standard level of the third cell is higher than the standard level of the first cell.

2. The method of claim 1, wherein before migrating a UE of the first cell to the second cell, the method further comprises:

determining third load prediction data according to the first load prediction data and the second load prediction data; and the migration condition comprises that the first load prediction data is lower than a preset first off threshold and the third load prediction data is lower than a preset first takeover threshold.

3. The method of claim 2, wherein before migrating a UE of the first cell to the second cell, the method further comprises:

acquiring first real-time load data of the first cell in a preset first time period; and the migration condition further comprises that the first real-time load data is lower than a preset first real-time load threshold.

4. The method of claim 1, further comprising:

prohibiting the first cell from allowing accessing by a new UE and adjusting the first cell to enter an off state, in response to migrating the UE of the first cell to the second cell.

5. The method of claim 4, further comprising:

in response to the operation of migrating the UE of the first cell satisfying a terminating condition, terminating the operation of migrating the UE of the first cell and allowing the first cell to be accessed by a new UE.

6. The method of claim 1, wherein after migrating a UE of the first cell to the second cell, the method further comprises:

acquiring second real-time load data of the second cell in a preset second time period; and migrating the UE from the first cell out of the second cell in response to the second real-time load data being higher than a preset second real-time load threshold.

7. The method of claim 6, wherein before migrating the UE from the first cell out of the second cell, the method further comprises:

allocating the shared spectrum resource corresponding to the first cell and occupied by the third cell to the first cell; and waking up the first cell in response to the first cell being in an off state.

8. The method of claim 1, wherein before migrating a UE of the first cell to the second cell, the method further comprises:

acquiring third real-time load data of the third cell in a third second time period; and the migration condition further comprises that the third real-time load data is higher than a preset third real-time load threshold.

9. A spectrum sharing apparatus, comprising a memory, a processor, and a computer program stored in the memory and executable by the processor, wherein the computer program, when executed by the processor, causes the processor to carry out a spectrum sharing method, comprising:

performing load prediction for a first cell to obtain first load prediction data;

performing load prediction for a second cell to obtain second load prediction data; and migrating a User Equipment (UE) of the first cell to the second cell and allocating a shared spectrum resource corresponding to the first cell to a third cell, in response to determining according to the first load prediction data and the second load prediction data that the first cell satisfies a migration condition, wherein a standard level of the first cell is higher than or equal to a standard level of the second cell, and a standard level of the third cell is higher than the standard level of the first cell.

10. A non-transitory computer-readable storage medium, storing a computer program which, when executed by a processor, causes the processor to carry out a spectrum sharing method, comprising:

performing load prediction for a first cell to obtain first load prediction data;

performing load prediction for a second cell to obtain second load prediction data; and migrating a User Equipment (UE) of the first cell to the second cell and allocating a shared spectrum resource corresponding to the first cell to a third cell, in response to determining according to the first load prediction data and the second load prediction data that the first cell satisfies a migration condition, wherein a standard level of the first cell is higher than or equal to a standard level of the second cell, and a standard level of the third cell is higher than the standard level of the first cell.

11. The spectrum sharing apparatus of claim 9, wherein before migrating a UE of the first cell to the second cell, the method further comprises:

determining third load prediction data according to the first load prediction data and the second load prediction data; and the migration condition comprises that the first load prediction data is lower than a preset first off threshold and the third load prediction data is lower than a preset first takeover threshold.

12. The spectrum sharing apparatus of claim 11, wherein before migrating a UE of the first cell to the second cell, the method further comprises:

acquiring first real-time load data of the first cell in a preset first time period; and the migration condition further comprises that the first real-time load data is lower than a preset first real-time load threshold.

13. The spectrum sharing apparatus of claim 9, further comprising:

prohibiting the first cell from allowing accessing by a new UE and adjusting the first cell to enter an off state, in response to migrating the UE of the first cell to the second cell.

14. The spectrum sharing apparatus of claim 13, further comprising:

in response to the operation of migrating the UE of the first cell satisfying a terminating condition, terminating the operation of migrating the UE of the first cell and allowing the first cell to be accessed by a new UE.

15. The spectrum sharing apparatus of claim 9, wherein after migrating a UE of the first cell to the second cell, the method further comprises:

acquiring second real-time load data of the second cell in a preset second time period; and migrating the UE from the first cell out of the second cell in response to the second real-time load data being higher than a preset second real-time load threshold.

16. The spectrum sharing apparatus of claim 15, wherein before migrating the UE from the first cell out of the second cell, the method further comprises:

allocating the shared spectrum resource corresponding to the first cell and occupied by the third cell to the first cell; and waking up the first cell in response to the first cell being in an off state.

17. The spectrum sharing apparatus of claim 9, wherein before migrating a UE of the first cell to the second cell, the method further comprises:

acquiring third real-time load data of the third cell in a third second time period; and the migration condition further comprises that the third real-time load data is higher than a preset third real-time load threshold.

18. The non-transitory computer-readable storage medium of claim 10, wherein before migrating a UE of the first cell to the second cell, the method further comprises:

determining third load prediction data according to the first load prediction data and the second load prediction data; and the migration condition comprises that the first load prediction data is lower than a preset first off threshold and the third load prediction data is lower than a preset first takeover threshold.

19. The non-transitory computer-readable storage medium of claim 18, wherein before migrating a UE of the first cell to the second cell, the method further comprises:

acquiring first real-time load data of the first cell in a preset first time period; and the migration condition further comprises that the first real-time load data is lower than a preset first real-time load threshold.

20. The non-transitory computer-readable storage medium of claim 10, further comprising:

prohibiting the first cell from allowing accessing by a new UE and adjusting the first cell to enter an off state, in response to migrating the UE of the first cell to the second cell.

* * * * *